(12) United States Patent
Mohr (10) Patent No.: US 6,896,303 B1
(45) Date of Patent: May 24, 2005

(54) VEHICLE BUMPER SYSTEM

(76) Inventor: Jeff G. Mohr, 1227 Kenneth St., Detroit Lakes, MN (US) 56501

( * ) Notice: Subject to any disclaimer, the term of this patent is extended or adjusted under 35 U.S.C. 154(b) by 73 days.

(21) Appl. No.: 10/835,605

(22) Filed: Apr. 28, 2004

(51) Int. Cl.[7] ............................................. B60R 19/24
(52) U.S. Cl. ...................... 293/117; 293/142; 293/155
(58) Field of Search ...................... 293/117, 142, 155, 293/102, 125; 280/504; D12/169, 172; 267/139, 267/140

(56) References Cited

U.S. PATENT DOCUMENTS

| | | | |
|---|---|---|---|
| 3,608,943 A * | 9/1971 | Gostomski | 293/155 |
| 3,717,362 A * | 2/1973 | Johnson | 293/117 |
| 3,751,072 A * | 8/1973 | Williams | 280/491.3 |
| 3,992,047 A | 11/1976 | Barenyi et al. | 293/9 |
| 4,889,374 A * | 12/1989 | Choun | 293/132 |
| 4,893,856 A | 1/1990 | Council | 293/106 |
| 5,366,264 A | 11/1994 | Guay | 293/125 |
| 5,478,124 A | 12/1995 | Warrington et al. | 293/125 |
| D375,066 S * | 10/1996 | Tisi | D12/169 |
| 5,620,218 A | 4/1997 | Saltzman et al. | 293/117 |
| 5,647,621 A * | 7/1997 | McClellan | 293/117 |
| 5,829,774 A | 11/1998 | Klemp | 280/507 |
| 6,398,276 B1 | 6/2002 | Smith | 293/142 |
| 6,659,519 B2 * | 12/2003 | Turner | 293/117 |
| 2003/0011164 A1 | 1/2003 | Cipolla | 280/164.1 |
| 2003/0184100 A1 | 10/2003 | Turner | 293/155 |

OTHER PUBLICATIONS

Go Rhino? SensorStep Mar. 2004 Gorhino.com website printout 1 page.
Cushioned Ball Mounts Mar. 2004 Convert-A-Ball 1 page.

* cited by examiner

*Primary Examiner*—Patricia L. Engle (57) ABSTRACT

A vehicle bumper system for absorbing impacts thereby reducing damage to a vehicle and the potential for bodily injury. The vehicle bumper system includes a bumper member, a tongue member extending from the bumper member for being received within a receiver hitch of a vehicle, a pair of slots extending longitudinally within the tongue member for receiving a pin and an inner absorbing member positioned within the tongue member for providing a biasing force to the bumper member with respect to the vehicle. An outer absorbing member is preferably positioned about the external portion of the tongue member for providing an additional biasing force to the bumper member.

18 Claims, 11 Drawing Sheets

VEHICLE BUMPER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to vehicle bumpers and more specifically it relates to a vehicle bumper system for absorbing impacts thereby reducing damage to a vehicle and the potential for bodily injury.

2. Description of the Related Art

Conventional rear bumpers for vehicles have been in use for years. A conventional rear bumper is typically non-movably attached to the frame of a vehicle. One problem with conventional rear bumpers is that they can be severely damaged upon impact with another vehicle or object resulting in costly repairs/replacement. Another problem with conventional rear bumpers is that immediately transfer the impact energy to the frame of the vehicle which can result in additional damage to the vehicle and/or individuals in the vehicle.

While these devices may be suitable for the particular purpose to which they address, they are not as suitable for absorbing impacts thereby reducing damage to a vehicle and the potential for bodily injury. Conventional rear bumpers are susceptible to damage during impacts and do not provide significant absorption of impacts.

In these respects, the vehicle bumper system according to the present invention substantially departs from the conventional concepts and designs of the prior art, and in so doing provides an apparatus primarily developed for the purpose of absorbing impacts thereby reducing damage to a vehicle and the potential for bodily injury.

BRIEF SUMMARY OF THE INVENTION

In view of the foregoing disadvantages inherent in the known types of rear bumpers now present in the prior art, the present invention provides a new vehicle bumper system construction wherein the same can be utilized for absorbing impacts thereby reducing damage to a vehicle and the potential for bodily injury.

The general purpose of the present invention, which will be described subsequently in greater detail, is to provide a new vehicle bumper system that has many of the advantages of the rear bumpers mentioned heretofore and many novel features that result in a new vehicle bumper system which is not anticipated, rendered obvious, suggested, or even implied by any of the prior art rear bumpers, either alone or in any combination thereof.

To attain this, the present invention generally comprises a bumper member, a tongue member extending from the bumper member for being received within a receiver hitch of a vehicle, a pair of slots extending longitudinally within the tongue member for receiving a pin and an inner absorbing member positioned within the tongue member for providing a biasing force to the bumper member with respect to the vehicle. An outer absorbing member is preferably positioned about the external portion of the tongue member for providing an additional biasing force to the bumper member.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a vehicle bumper system that will overcome the shortcomings of the prior art devices.

A second object is to provide a vehicle bumper system for absorbing impacts thereby reducing damage to a vehicle and the potential for bodily injury.

Another object is to provide a vehicle bumper system that may be attached to various vehicle hitches.

An additional object is to provide a vehicle bumper system that may be easily attached and removed with respect to existing vehicles.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 7b is a cross sectional view taken along line 7b—7b of FIG. 7a.

DETAILED DESCRIPTION OF THE INVENTION

Turning now descriptively to the drawings, in which similar reference characters denote similar elements throughout the several views, FIGS. 1 through 10 illustrate a vehicle bumper system 10, which comprises a bumper member 20, a tongue member 30 extending from the bumper member 20 for being received within a receiver hitch 12 of a vehicle, a pair of slots 32 extending longitudinally within the tongue member 30 for receiving a pin 14 and an inner absorbing member 50 positioned within the tongue member 30 for providing a biasing force to the bumper member 20 with respect to the vehicle. An outer absorbing member 40 is preferably positioned about the external portion of the tongue member 30 for providing an additional biasing force to the bumper member 20.

The bumper member 20 is preferably comprised of an elongate and rigid structure as best illustrated in FIGS. 1, 5, 6 and 8 of the drawings. The bumper member 20 may be comprised of a tubular structure and may have various steppin 14g accessories attached thereto. The bumper member 20 may be comprised of various structures and configurations other than shown in FIGS. 1 through 10 of the drawings. A tubular receiver 24 preferably extends from the bumper member 20 concentrically about the tongue member 30 for receiving a distal end of the outer absorbing member 40 as shown in FIGS. 1 through 10 of the drawings.

Figure 2:
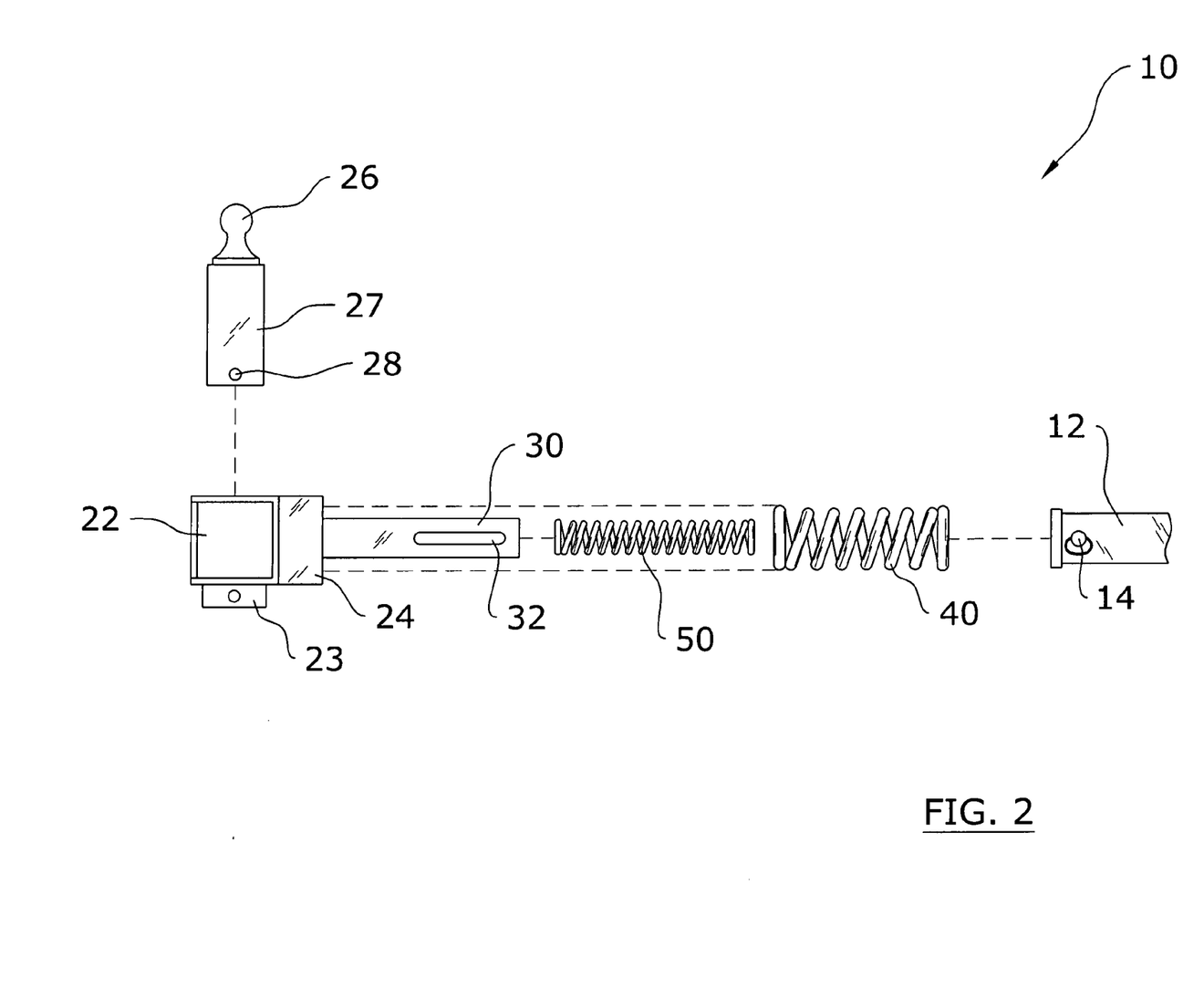
FIG. 2 is an exploded side view of the present invention.
Figure 3:
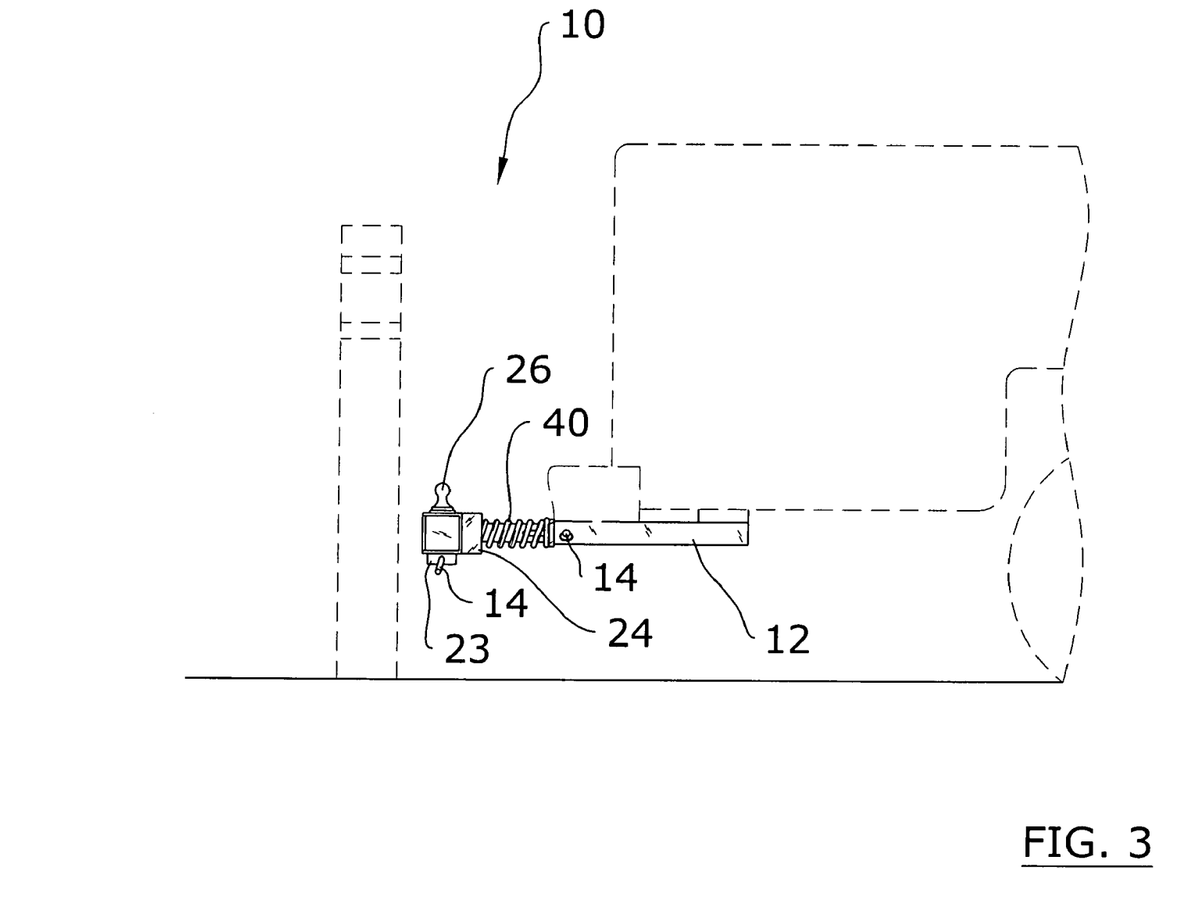
FIG. 3 is a side view of the present invention attached to a vehicle.
Figure 4:
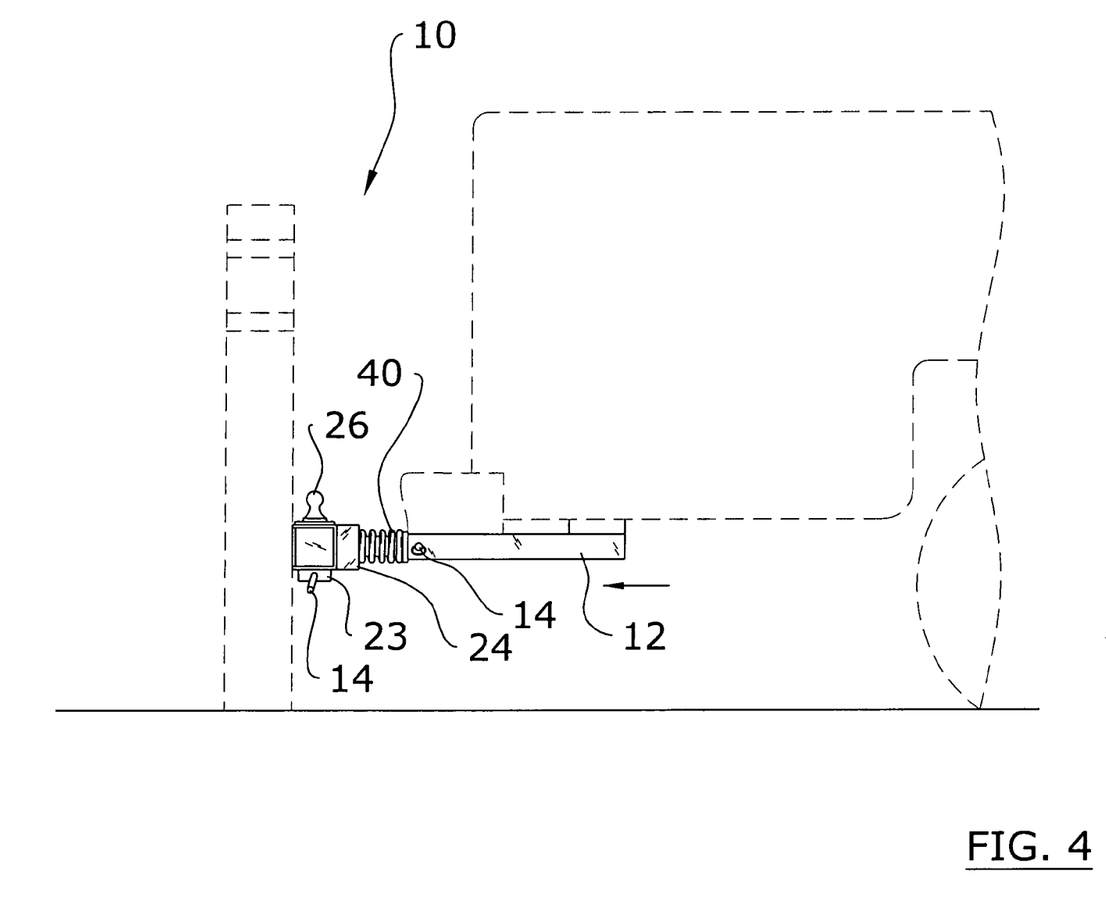
FIG. 4 is a side view of the present invention impacting an object.
Figure 5:
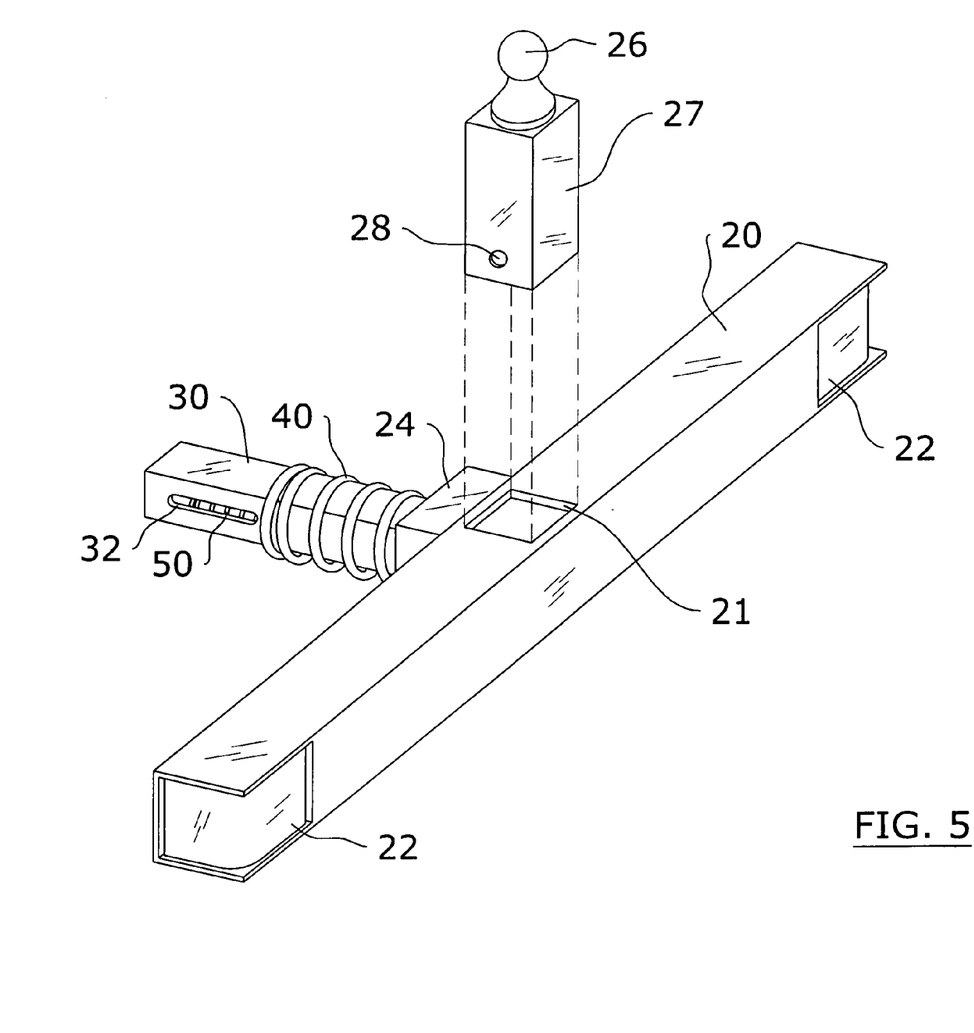
FIG. 5 is an upper perspective view of the present invention with the ball removed from the bumper.
Figure 6:
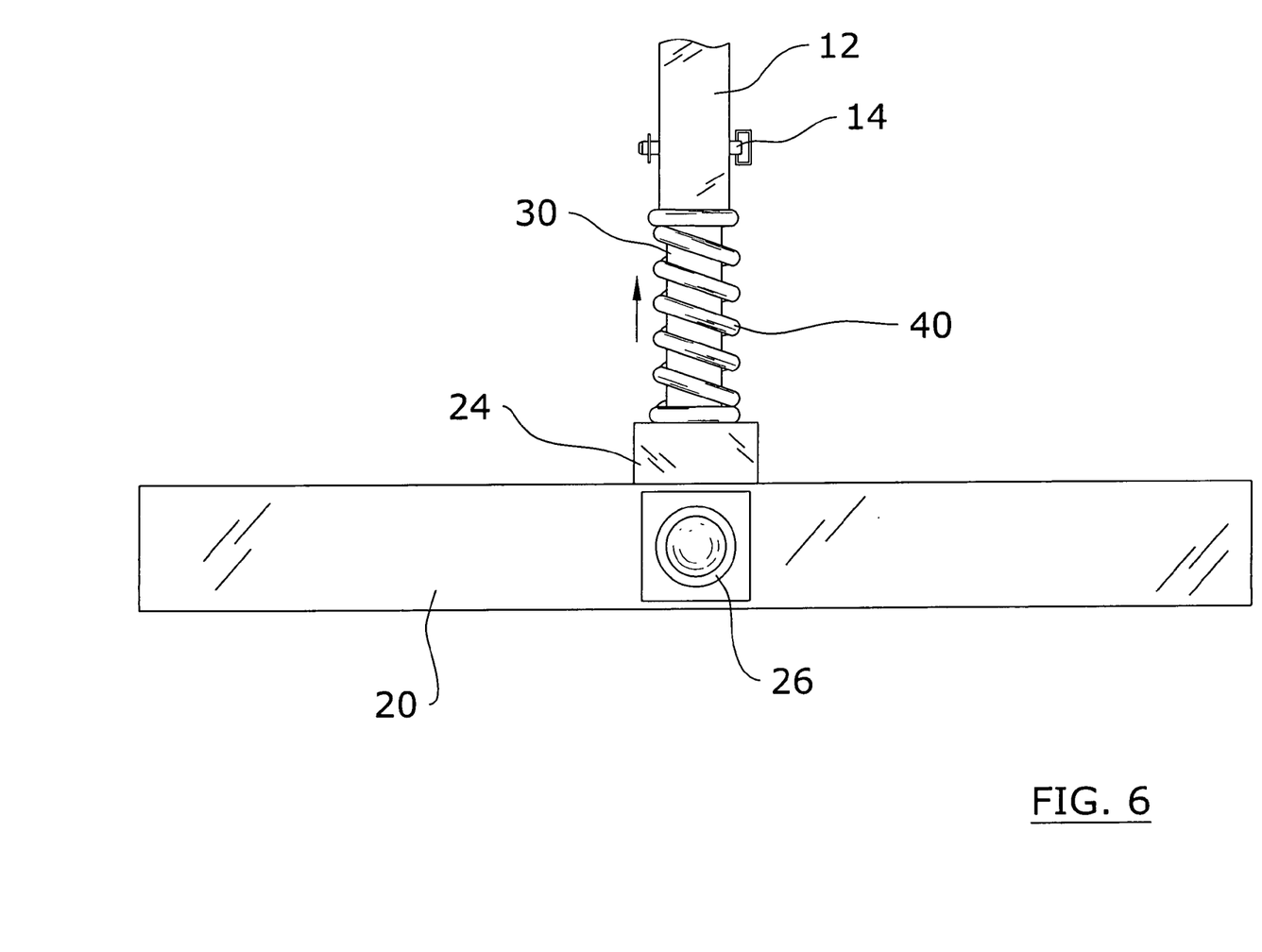
FIG. 6 is a top view of the present invention.

The tongue member 30 extends from the bumper member 20 as illustrated in FIG. 2 of the drawings. The tongue member 30 is slidably received within a receiver hitch 12 of a vehicle as shown in FIGS. 3, 4 6, 7a and 9 of the drawings. The tongue member 30 preferably has an elongate tubular structure and rectangular cross section that is slidably receivable within an opening within a conventional receiver hitch 12. The tongue member 30 is preferably substantially transverse with respect to the bumper member 20 as best illustrated in FIGS. 5 and 6 of the drawings.

A pair of slots 32 extend within opposing sides of the tongue member 30 for slidably receiving a transverse pin 14 extending through the receiver hitch 12 as shown in FIGS. 1, 2, 5 and 7a of the drawings. The slots 32 are preferably elongated in structure and have a length sufficient to allow for adequate movement of the tongue member 30 within the receiver hitch 12 upon impact of the bumper member 20. The slots 32 are preferably substantially the same length and parallel to one another.

Figure 1:
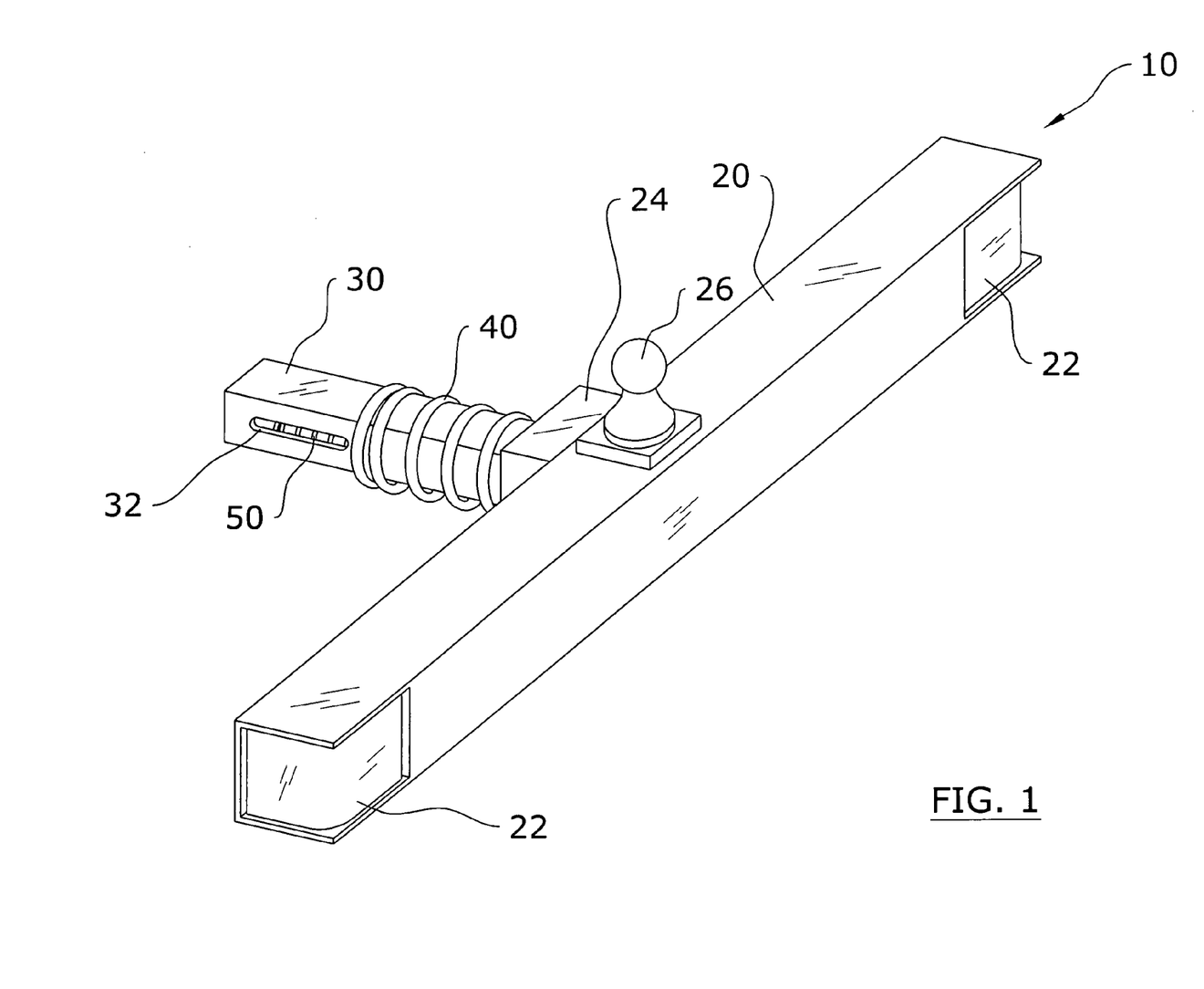
FIG. 1 is an upper perspective view of the present invention.
Figure 7A:
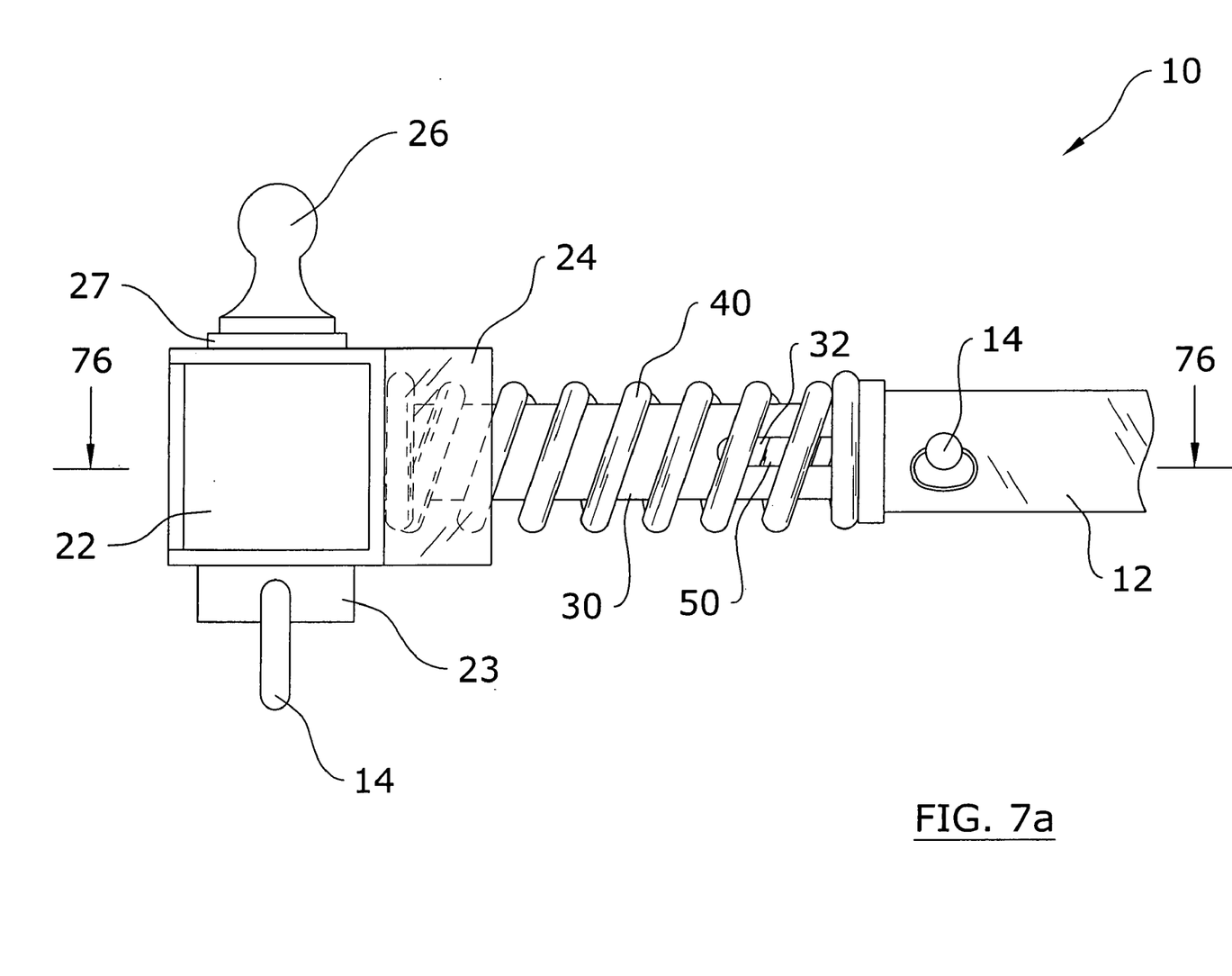
FIG. 7a is a magnified side view of the present invention.
Figure 7B:
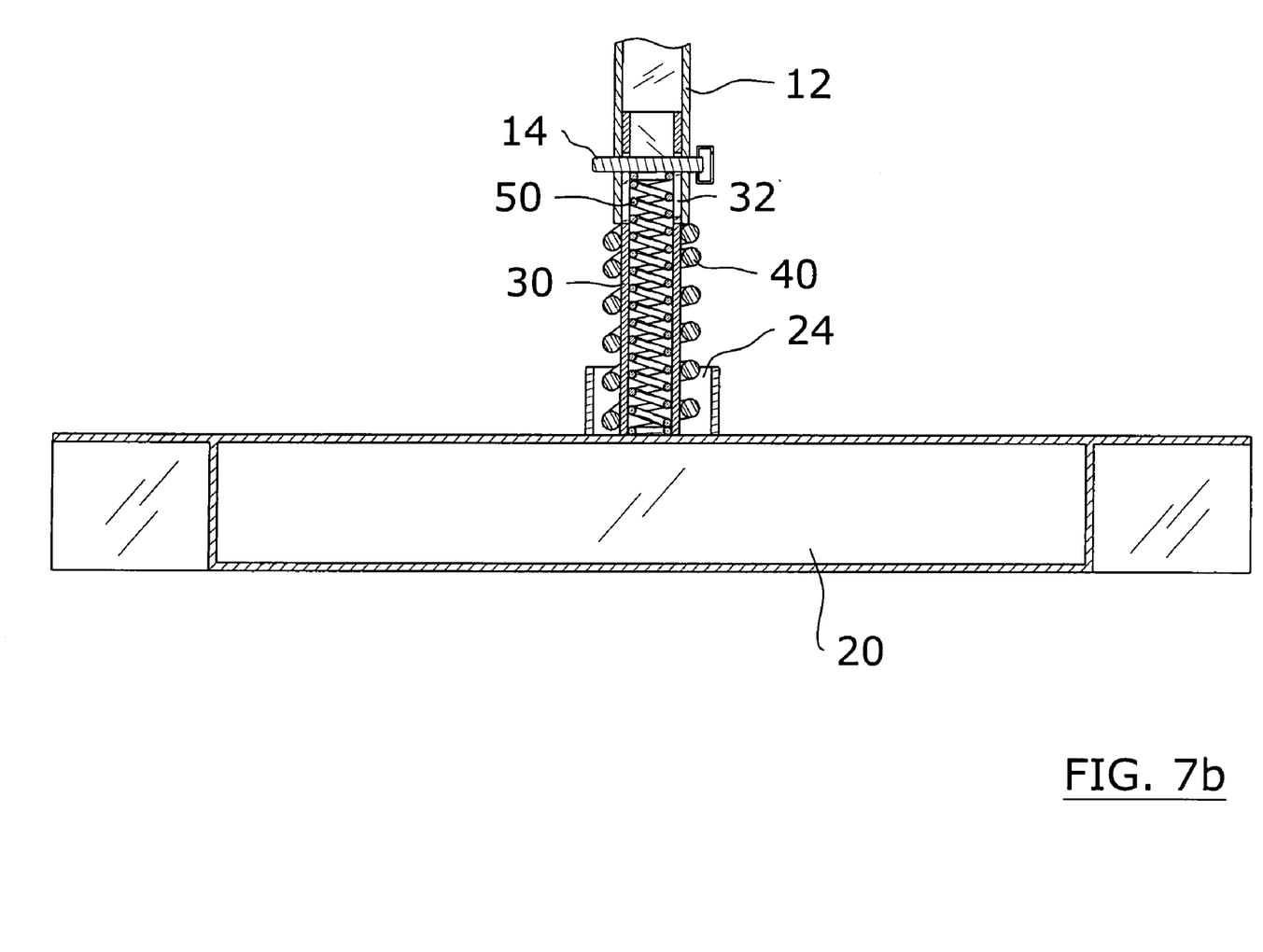
Figure 8:
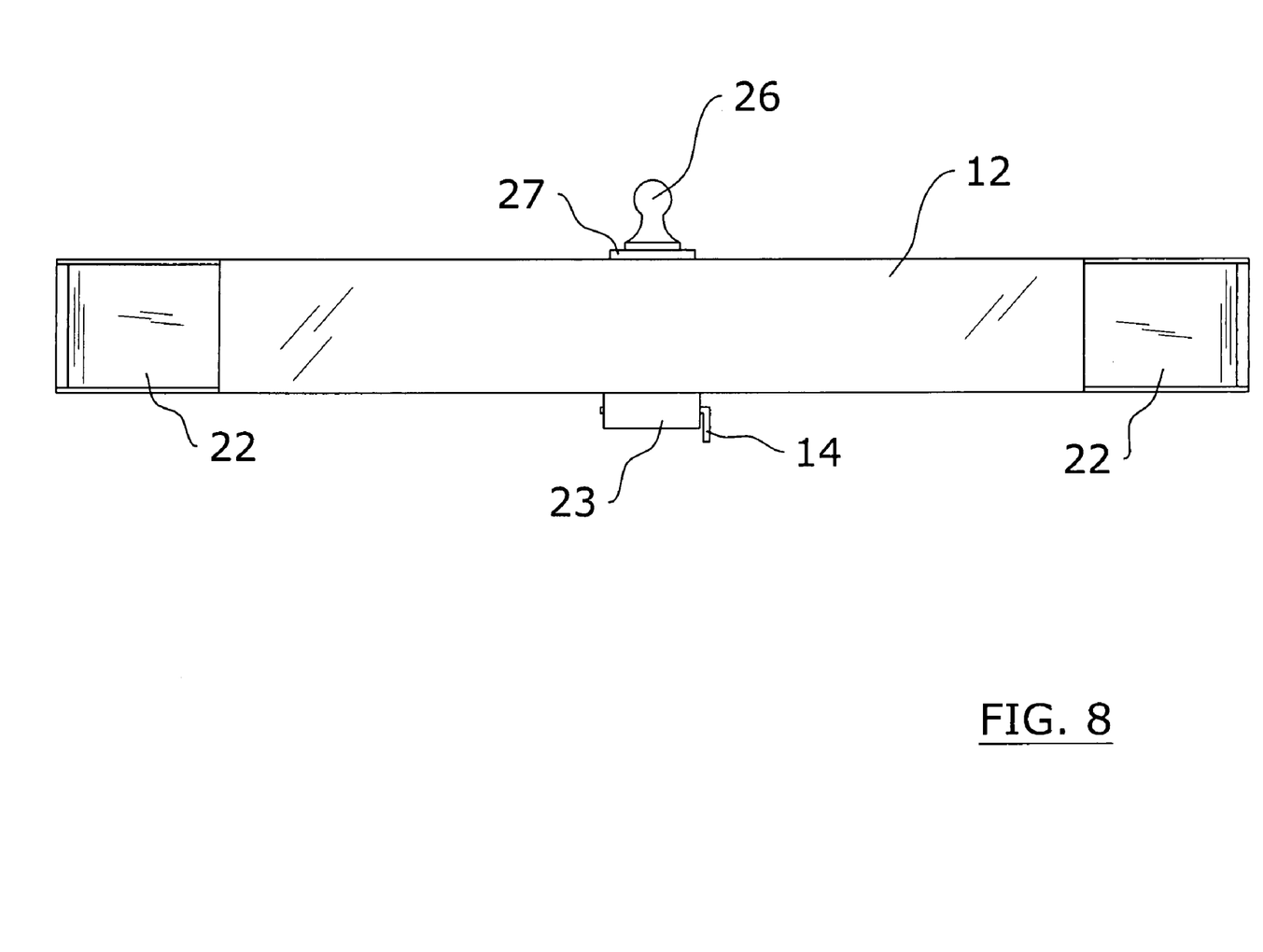
FIG. 8 is a rear view of the present invention.
Figure 9:
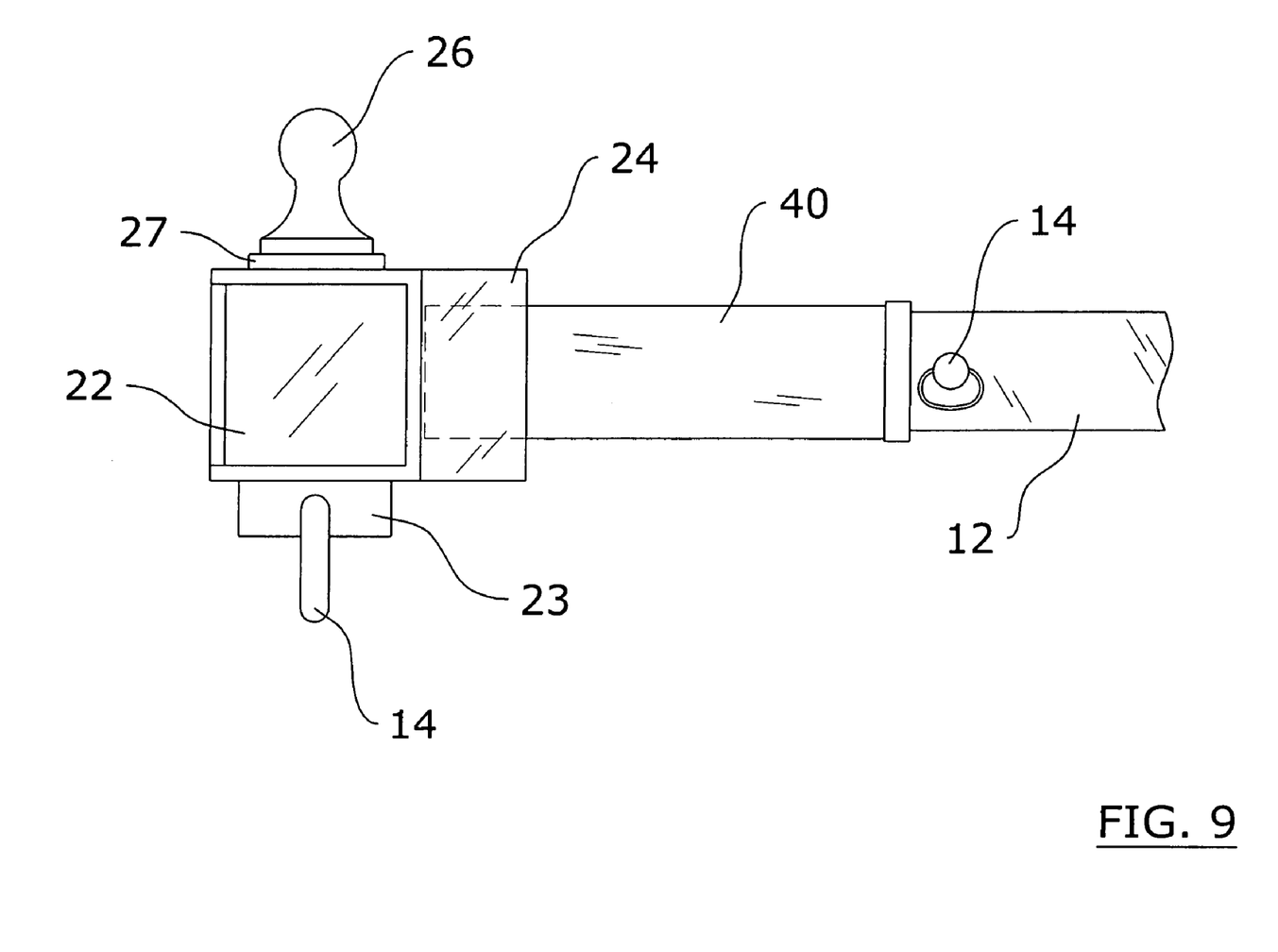
FIG. 9 is a side view of an alternative embodiment of the present invention.

An inner absorbing member 50 is preferably positioned within the interior of the tubular tongue member 30 for providing a first biasing force to the bumper member 20 with respect to a vehicle as shown in FIGS. 1 and 2 of the drawings. The inner absorbing member 50 has a first end and a second end, wherein the first end engages the pin 14 extending through the receiver hitch 12 and the slots 32 and wherein the second end engages the interior end of the tongue member 30 as shown in FIG. 7b of the drawings. The inner absorbing member 50 is thereby compressed between the pin 14 and the interior end of the tongue member 30 when the bumper member 20 is impacted.

Figure 10:
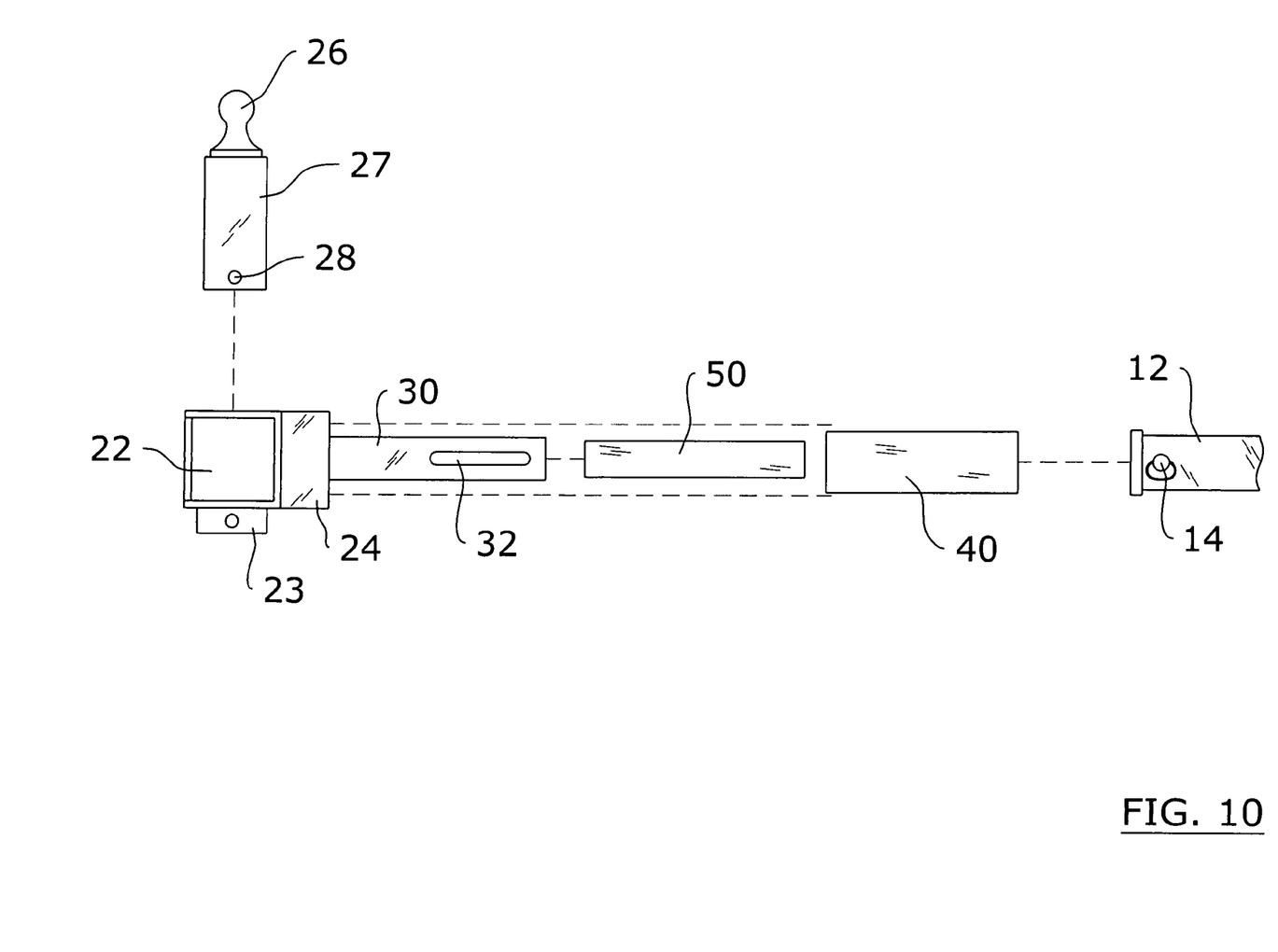
FIG. 10 is an exploded side view of the alternative embodiment of the present invention.

The inner absorbing member 50 is comprised of an elongated compression spring as shown in FIGS. 1 and 2 of the drawings. However, the inner absorbing member 50 may alternatively be comprised of a resilient material such as rubber as shown in FIG. 10 of the drawings.

An outer absorbing member 40 is also preferably positioned about an external portion of the tongue member 30 for providing a second biasing force to the bumper member 20 as shown in FIGS. 1 through 7a of the drawings. The outer absorbing member 40 has a first end and a second end similar to the inner absorbing member 50, wherein the first end engages the outer lip of the receiver hitch 12 and wherein the second end engages the interior surface of the bumper member 20 as shown in FIG. 7b of the drawings. The outer absorbing member 40 is thereby compressed between the receiver hitch 12 and the bumper member 20 when the bumper member 20 is impacted. The outer absorbing member 40 may be utilized together with the inner absorbing member 50, or alternatively the outer absorbing member 40 may be utilized without the inner absorbing member 50.

The outer absorbing member 40 is comprised of an elongated compression spring as shown in FIGS. 1 through 7b of the drawings. However, the outer absorbing member 40 may alternatively be comprised of a tubular resilient material such as rubber as shown in FIG. 10 of the drawings.

One or more lights 22 may be positioned within the bumper member 20 and electrically connected to the electrical system of the vehicle. For example, the lights 22 may be comprised of taillights 22, reverse lights 22 and signal lights 22. The lights 22 may also be comprised of reflectors and other light emitting/reflecting devices. The lights 22 may be positioned on the distal portion or inner portions of the bumper member 20.

A ball member 26 is preferably attached to the bumper member 20 as shown in FIGS. 1 through 10 of the drawings. The ball member 26 preferably includes an extended portion 27 with at least one receiver aperture 28 extending through the extended portion 27. The extended portion 27 is extendable within a receiver opening 21 within the bumper member 20 and a lower receiver 23 within the bumper member 20 as further shown in FIGS. 2, 5 and 7a of the drawings. After the extended portion 27 is positioned within the receiver opening 21 and the lower receiver 23, the user extends a pin 14 through the lower receiver 23 and the extended portion 27 to lock the extended portion 27 within the lower receiver 23.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A vehicle bumper system, comprising:
   a bumper member;
   a tongue member extending from said bumper member for being slidably received within a receiver hitch of a vehicle, wherein said tongue member has a tubular structure;
   a pair of slots within opposing sides of said tongue member for slidably receiving a transverse pin extendable through a receiver hitch; and
   an inner absorbing member positioned within said tongue member for providing a first biasing force to said bumper member with respect to a vehicle.

2. The vehicle bumper system of claim 1, wherein said inner absorbing member is comprised of a compression spring.

3. The vehicle bumper system of claim 1, wherein said inner absorbing member is comprised of a resilient material.

4. The vehicle bumper system of claim 3, wherein said resilient material is comprised of rubber.

5. The vehicle bumper system of claim 1, including an outer absorbing member is positioned about an external portion of said tongue member for providing a second biasing force to said bumper member.

6. The vehicle bumper system of claim 5, wherein said inner absorbing member is comprised of a compression spring.

7. The vehicle bumper system of claim 5, wherein said outer absorbing member is comprised of a compression spring.

8. The vehicle bumper system of claim 5, wherein said outer absorbing member is comprised of a resilient material.

9. The vehicle bumper system of claim 8, wherein said resilient material is comprised of rubber.

10. The vehicle bumper system of claim 1, wherein said bumper is substantially transverse with respect to said tongue member.

11. The vehicle bumper system of claim 1, including a tubular receiver extending from said bumper member concentrically about said tongue member.

12. The vehicle bumper system of claim 1, including at least one light within said bumper member.

13. The vehicle bumper system of claim 1, including a ball member attached to said bumper member.

14. The vehicle bumper system of claim 1, wherein said ball member includes an extended portion with at least one receiver aperture, wherein said extended portion is extendable within a receiver opening within said bumper member and a lower receiver within said bumper member.

15. A vehicle bumper system, comprising:

a bumper member;

a tongue member extending from said bumper member for being slidably received within a receiver hitch of a vehicle, wherein said tongue member has a tubular structure;

a pair of slots within opposing sides of said tongue member for slidably receiving a transverse pin extendable through a receiver hitch; and an outer absorbing member positioned on said tongue member for providing a biasing force to said bumper member with respect to a vehicle.

16. The vehicle bumper system of claim 15, wherein said outer absorbing member is comprised of a compression spring.

17. The vehicle bumper system of claim 15, wherein said outer absorbing member is comprised of a resilient material.

18. The vehicle bumper system of claim 17, wherein said resilient material is comprised of rubber.

* * * * *